United States Patent [19]  [11] 4,230,053
Deardorff et al.  [45] Oct. 28, 1980

[54] METHOD OF DISPOSING OF TOXIC SUBSTANCES

[76] Inventors: Paul A. Deardorff, 1128 Dix, Lincoln Park, Mich. 48146; Robert C. Wood, 36002 Huron River Dr., New Boston, Mich. 48164; Sante M. Cundari, 530 Woodcrest, Dearborn, Mich. 48124

[21] Appl. No.: 9,108

[22] Filed: Feb. 5, 1979

Related U.S. Application Data

[63] Continuation-in-part of Ser. No. 923,054, Jul. 10, 1978, which is a continuation-in-part of Ser. No. 901,492, May 1, 1978.

[51] Int. Cl.$^3$ ............................................... F23G 7/00
[52] U.S. Cl. ..................................... 110/346; 110/237
[58] Field of Search ............... 110/346, 235, 237, 238; 149/44, 37

[56] References Cited

U.S. PATENT DOCUMENTS

| | | | |
|---|---|---|---|
| 3,832,151 | 8/1974 | Kitaoka et al. | 110/346 X |
| 3,881,295 | 5/1975 | Derby | 110/346 X |
| 3,981,252 | 9/1976 | Ticker | 110/346 |
| 4,133,273 | 1/1979 | Glennon | 110/346 |

*Primary Examiner*—Edward G. Favors
*Attorney, Agent, or Firm*—Gifford, VanOphem, Sheridan & Sprinkle

[57] ABSTRACT

The present invention advantageously uses a composition which includes iron-containing waste materials to dispose of the toxic and troublesome substances, polybrominated biphenyls (PBB). First, waste materials from the conversion of iron ore to pig iron or steel combine with a reducing metal, such as aluminum or magnesium, and a small portion of a mineral acid to form a reaction mixture which gives a heat output superior to many conventional fuels and at a very high temperature. Then, this composition is heated to a reaction temperature with pure PBB or items contaminated with PBB to thereby chemically break down the PBB.

16 Claims, No Drawings

METHOD OF DISPOSING OF TOXIC SUBSTANCES

CROSS-REFERENCE

The present invention is a continuation-in-part of our copending U.S. patent application Ser. No. 923,054 filed July 10, 1978 which is a continuation-in-part of our copending U.S. patent application Ser. No. 901,492 filed May 1, 1978.

BACKGROUND OF THE INVENTION

I. Field of the Invention

The present invention relates generally to fuels and disposal of toxic materials especially the use of high temperature reactants to break down PBB and similar substances such as polychlorinated biphenyls (PCB).

II. Description of the Prior Art

PBB has a structure from

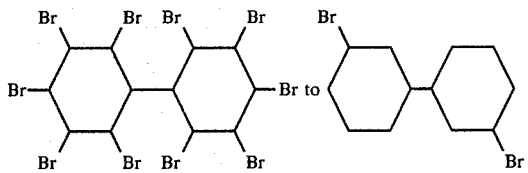

where at least two of the bromine molecules shown are present in any of those positions shown. PBB, PCB and similar toxic substances have been used widely in Michigan and other places as fire retardants and for other purposes. In recent years, problems have developed from contamination of farm animals and other objects, both animate and inanimate. This contamination has alarmed citizens because of the potential and actual poisoning of human beings directly and indirectly from the use of PBB. PBB has, therefore, been banned from use in Michigan and attempts have been made to destroy both the remaining supply and items contaminated with PBB. To date no completely satisfactory method has been found.

Many disposals have been made of pure PBB, PCB, and contaminated items at locations throughout Michigan and other states. Some of these disposals were made prior to the discovery of the extreme toxic effects of PBB. At one point, PBB was carelessly added to animal feed which was fed to animals, thereby contaminating such animals (including chickens, dairy cattle, and beef cattle). These animals were thereby rendered unfit for human consumption and had to be destroyed (the milk of the contaminated dairy cattle and the eggs from the contaminated chickens were also destroyed). A great amount of testing was conducted by owners of farm animals to determine PBB contamination. Furthermore, the owners of the worthless carcasses were put to great expense and trouble, not only from the loss of property value in the animals, but also due to the problem of disposal of the carcasses.

The Michigan Department of Natural Resources (DNR), a state agency, was assigned responsibility for disposal of the PBB and contaminated items. In one burial operation at Mio, Michigan, the DNR buried tons of contaminated animals in a "clay-lined" pit. This burial and similar disposals of PBB have caused great controversy among the citizenry and still remain as political "hot potatoes." An alarm has been raised as to potential pollution of water sources with resultant contamination of human beings.

Evidence of increased PBB contamination in humans and its side effects is surfacing regularly. In our tests conducted in conjunction with our copending application Ser. No. 923,054, tests were conducted to analyze the makeup of a typical sewage sludge cake. The tests showed that a sewage sample from Ann Arbor, Michigan contained one (1) part per million (ppm) PBB. This is an alarming figure in view of the fact that few disposal sites are known to exist in close proximity to Ann Arbor. The obvious conclusion is that people have been PBB contaminated by either polluted drinking water or polluted food, although the route of contamination is not known.

Litigation has been started claiming damaging effects of PBB, including birth defects. A recent study indicated that children with higher PBB levels of contamination have a lower learning ability than those with lower PBB levels or those with no contamination. Thus, the problem with PBB disposal has become dramatic. Attempts to burn PBB have been both ineffective and restricted. Burning PBB presents the problem of air pollution from undecomposed PBB in effluent smoke and gases. This, of course, is unacceptable, presenting a quicker route for human poisoning than by burying.

It has recently been determined, however, that decomposition of PBB occurs spontaneously at temperatures in excess of 2000° F. under controlled conditions. Thus, such a disposal is most desirable since no effluent smoke or gas would be PBB contaminated and residue would contain only chemicals which remain after decomposition of the PBB. Although other toxic substances are emitted with the evolving gas from heating PBB, known methods are available for "scrubbing" or otherwise safely recovering such substances.

SUMMARY OF THE INVENTION

We have recently discovered that PBB can be very well eradicated through decomposition of PBB by burning it with our thermit composition. Although other items achieve such temperatures as are required for the decomposition of PBB, none have the efficiency and sustained burning from such an inexpensive and accessible source of fuel.

We dispose of PBB by first creating our composition fuel and then burning the PBB or contaminated items in the presence of the exothermic reaction of our fuel composition so as to heat and decompose the PBB.

We form a composition wherein the primary ingredient is an iron-containing waste by-product from steel production or similar processes. These by-products had heretofore been merely disposed of. These waste materials are combined with a concentrated mineral acid and retardants. Alternatively, diluted acid may be used thus requiring less water to make the mixture moldable in a later step. Aluminum, magnesium, or another reducing metal is added to enough water to make the mixture pliable. The mixture is then molded and is cured for a short period. Sufficient heating of a small portion induces reaction of the entire sample.

We have devised a method of disposing of PBB by reacting the above-described composition in sufficient quantity in close proximity with PBB or items contaminated therewith, e.g., contaminated cattle. This breaks down the PBB into its chemical substituents such that the harmful effects of PBB are no longer existent. Bromine gas and other bromine compounds are products of the reaction.

The structure of PBB material and portions of thermit material may be arranged in a multitude of ways including: stacking the contaminated material and thermit fuel in successive layers, wrapping the contaminated material in a coat of thermit fuel, and burning the contaminated material on a bed of the thermit material in a controlled furnace. It can be seen that the last structure mentioned could feature testing devices to control the reaction or method so as to assure complete decomposition of the PBB before releasing the products of decomposition.

It is therefore an object of the present invention to provide an effective method of PBB disposal.

It is also an object of the present invention to provide a reaction composition to heat PBB and items contaminated therewith so as to decompose the PBB.

It is a further object of the present invention to provide a safe, economical way of disposing of PBB.

It is also an object of the present invention to prevent further PBB contamination from past and future disposal sites.

It is a further object of our invention to use the exothermic heat of reaction of our thermit material to decompose PBB.

Based upon studies conducted for the disposal of PCB, it is known that the PCB molecule can be decomposed by heating a material contaminated with PCB to at least 2000° F. for a "resonance" period of at least two seconds. It must be emphasized that complete decomposition is only achieved if all of the contaminant is exposed to the minimum temperature requirement for about two seconds.

By way of example, consider a portion of a PBB contaminated carcass in an enclosed furnace. Not only must the carcass be "burned" at 2000° F. but the effluent gases must be held at the required temperature for about two seconds, either in the same or a separate chamber.

Part of the fire retardant capability of PCB and PBB depends upon the ease of breaking off the halogen atom to form the diatomic molecule or other gases in a fire so as to smother and cool the fire. PBB is considered a better retardant than PCB because the carbon-bromine bond is weaker (68 kcal./mole at 25° C.) than the carbon-chlorine bond (81 kcal/mole at 25° C.). The weaker bond energy allows the bromine to break off easier than chlorine in a fire and thus more readily cool/smother the fire.

Because of the above-described phenomenon, however, PBB is also more difficult to destroy than PCB. Thus, it is recognized that the 2000° F., two second parameters discussed above are somewhat greater for PBB than PCB. Recent tests show that the temperature should be in excess of 2000° F. for about three seconds.

It should be understood, however, that a higher temperature reduces the time requirement for the "resonance" period although an exact correlation has not at this point been determined for a scale of temperatures above 2000° F.

We have provided therefore a method of decomposing PBB or similar pollutant-potential chemicals by placing such materials in close proximity with a thermit composition of acid, iron-containing waste materials, and a pulverulent metal, with sufficient water for pliability, and reacting the composition.

DESCRIPTION OF THE PREFERRED EMBODIMENT

Applicants have devised a method of combining any of several iron-containing by-products with other materials to form a composition in either shaped or loose form to be used for heat production. Tests have shown that the exothermic heat produced by such compositions is so great in some cases that retardants such as sand or lime should be added to control the reaction and extend the reaction time.

Any of several by-products may be used. These include flue dust, mill scale, B.O.P. dust, filter cake, and sinter blends. In addition to the above list of by-products, any dust-like or powdery iron-containing waste product is suitable for the invention. Analysis of the materials was performed and all contain iron oxides. By way of example, the following result was obtained for B.O.P. dust.

| Substance | Approximate % by weight |
| --- | --- |
| Free metallic iron | 0.4 |
| $Fe_2O_3$ | 49.0 |
| FeO | 20.4 |
| Carbon | 0.7 |
| $H_2O$ (liquid) | 1.0 |
| PbO | 0.7 |
| ZnO | 5.1 |
| CaO | 11.3 |
| MnO | 0.9 |
| $P_2O_5$ | 0.1 |
| $SiO_2$ | 1.7 |
| $Al_2O_3$ | 0.5 |
| MgO | 2.8 |
| Moisture | 1.9 |

B.O.P. dust is a by-product from steel production. Most steel production from iron ore involves two basic phases. The first phase melts iron ore in a blast furnace producing iron, clinkers, and in relatively small amounts several dust-like iron containing waste by-products. These dust-like by-products collect on the iron, in flues, and on other areas. The second phase of the steel production converts the aforementioned iron to steel in an electric furnace. This electric furnace process also produces relatively small amounts of iron-containing waste by-products. The by-products from both phases normally vary from about 30% to about 70% by weight iron.

The aluminum or other reducing metal is preferably smaller than about 1/10 inch in its largest dimension. Any mineral acid is effective in the process either alone or in combination, but hydrochloric is preferred.

The burn rate can be controlled by variation of the portions of retardant, waste material, or reducing metal. The materials should fit within the parameters listed below:

| Material | Parameter |
| --- | --- |
| Iron-containing by-products: | at least about 50% to 95% of the composite mixture |
| Reducing metal: | about 12% to about 25% by weight of the iron-containing by-product |
| Retardant: | less than about 40% by weight of iron-containing by-product |
| Acid: | about 2% to about 10% by weight of the iron-containing by-product |

| Material | Parameter |
|---|---|
| Water: | enough to make the mixture pliable. |

Tests have indicated that these compositions burn well with coal. Aluminum "dross," an impure aluminum waste, has been used in pulverulent form in lieu of commercially purchased metal. This has proven effective for the reaction when used in sufficient quantity and again, lowers the cost of the composition.

It is the scheme of the present invention to dispose of PBB and similar items on both a small and large scale to thereby prevent future pollution by this toxic substance.

As disclosed in our parent copending U.S. application Ser. No. 923,054 an analysis of an Ann Arbor, Mich. sewage sludge cake sample disclosed the following ingredients:

| Sludge Cake Ingredient | Approximate % by weight | |
|---|---|---|
|  | Sample A | Sample B |
| Sulfur | 1.0 | 1.1 |
| Carbon | 49.0 | 47.1 |
| Hydrogen | 5.2 | 5.0 |
| Oxygen | 8.8 | 9.4 |
| Nitrogen | 4.7 | 5.1 |
| Chlorine | 1.0 | 1.2 |
| Calcium Oxide | 14.8 | 15.1 |
| Magnesium Oxide | 2.6 | 3.0 |
| Iron Oxide | 8.8 | 7.9 |
| Sodium and Potassium Oxide | 2.3 | 1.8 |
| Titanium Dioxide | Trace | Trace |
| Mercury | Trace | Trace |
| *Pbb | Trace | Trace |
| Zinc Oxide | 0.9 | 1.2 |
| Silicon Dioxide | Balance | Balance |

The trace of PBB was reported at the level of one (1) ppm. Given the recent history of the substance, this level is considered substantial.

The following are examples of the method for disposing of PBB and PBB contaminated items, according to the invention.

EXAMPLE 1

A portion of a standard solution of 100 ppm PBB in water was mixed with a typical thermit composition of:
- 15 ounces of black filter cake slurry
- 5 ounces of B.O.P. dust
- 10 ounces of previously cured composition (containing approximately the same proportions of components as this mixture without this item).
- 2.5 ounces of hydrochloric acid solution, 20% by weight
- One once of water
- Six ounces aluminum (#101 grade) to obtain the equivalent of 10 ppm PBB The composition was allowed to cure for about one hour.

A control test was run before reacting the mixture to assure that the PBB was still present and not disintegrated from other causes. A portion of the reaction mixture was then heated to about 3000° F. whereupon the entire sample (2"×3"×2" in size) began to react with a "burn" rate of about 1.96 cubic inches/minute, a relatively slow reaction. The heat of reaction was calculated to be approximately 150,000 BTU/lb. of composition with the reaction reaching temperatures from 3000°–6000° F. Analysis of the resulting residue revealed no remaining PBB when evaluated to an accuracy of 0.02 ppm. Other equipment is available for detecting PBB to the accuracy of one-tenth (1/10) part per billion.

EXAMPLE 2

The PBB sample of 100 ppm was added to the iron-containing waste material composition which was as follows:
- Six ounces of black filter cake slurry
- 4.5 ounces of hydrochloric acid, 20% by weight
- Four ounces of water
- Fifteen ounces of aluminum (#101 grade) so as to dilute the composition to 10 ppm PBB The composition was allowed to cure for about one hour. The sample was diluted and tested within appropriate ranges as above. A portion of the reaction mixture was then heated and the sample (3"×2"×3") began to react with a "burn" rate of approximately 7.3 cubic inches/minute, a relatively fast burn. The exothermic heat value was in excess of 200,000 BTU/lb. of composite with the reaction reaching temperatures in the range of 3000°–6000° F.

Although the above examples illustrate PBB disposed on only a small scale, the method can easily be carried out in an enlarged facility with sufficient quantities of PBB to insure complete eradication of the PBB compound. In-process chemical analysis techniques such as chromatographic mass spectrometry can be used to insure complete decomposition of the PBB and thereby guard against PBB air pollution or pollution within the nongaseous residue.

What is claimed is:

1. A method of disposing of toxic material comprising the steps of:
    placing said material to be disposed of in close proximity with a thermit composition producing heat and capable of reaction at temperatures in excess of 3000° F., said composition comprising
        about 50% to 95% by weight of an iron-containing by-product from the production of steel; a mineral acid; about 10% to about 25% by weight pulverulent reducing metal selected from the group consisting of aluminum, magnesium, and manganese; and water; and
    reacting said composition to dispose of said material by heating at least a portion of said composition to about 3000° F. to initiate reaction whereby said composition reacts at temperatures in excess of 3000° F. thereby heating said material so as to decompose said material.

2. The method according to claim 1 wherein said material is a polyhalogenated biphenyl having the structure

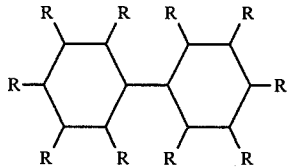

where at least two R's are a halogen and the remaining R's are a hydrogen.

3. The method according to claim 1 wherein said material is polybrominated biphenyl.

4. The method of claim 1 wherein said material is polychlorinated biphenyl.

5. The method of claim 1 wherein close proximity comprises placing said material in physical contact with said thermit composition prior to reaction.

6. The method of claim 1 further comprising carrying out such method in a controlled environment so as to check effluent gas for the presence of said material in order to assure decomposition of said material without PBB air pollution.

7. The method of claim 1 wherein said material and said thermit composition are placed in successive layers before reaction for decomposition of said material.

8. The method of claim 5 wherein physical contact comprises mixing said material with said thermit composition before reaction.

9. The method of claim 6 wherein said check on effluent gas is done by spectrometric methods.

10. A method of decomposing a toxic material comprising the steps of:
 (a) placing said material in a furnace chamber for decomposition;
 (b) placing also in said chamber, in an amount sufficient to decompose said toxic material, a thermit composition comprising,
  about 50% to 95% by weight of an iron-containing by-product from the production of steel; a mineral acid; about 10% to about 25% by weight pulverulent reducing metal selected from the group consisting of aluminum, magnesium, and manganese; and water; and after closing said chamber,
 (c) reacting said thermit composition by heating at least a portion of said composition to about 3000° F. to initiate reaction whereby all of said toxic material is held in said chamber at a sufficient decomposition temperature for a resonance period sufficient to decompose all of said toxic material.

11. The method of claim 10 wherein said material is a PBB.

12. The method of claim 10 wherein said material is a PCB.

13. The method of claim 10 wherein said decomposition temperature is at least 2000° F.

14. The method of claim 10 wherein said resonance period is about two seconds.

15. The method of claim 10 wherein said toxic material is a PBB-contaminated item.

16. The method of claim 10 wherein said toxic material is a PCB-contaminated item.

* * * * *